(12) United States Patent
Lee

(10) Patent No.: US 12,148,906 B2
(45) Date of Patent: Nov. 19, 2024

(54) BATTERY MODULE

(71) Applicant: SK On Co., Ltd., Seoul (KR)

(72) Inventor: Yong Hee Lee, Daejeon (KR)

(73) Assignee: SK On Co., Ltd., Seoul (KR)

( * ) Notice: Subject to any disclaimer, the term of this patent is extended or adjusted under 35 U.S.C. 154(b) by 0 days.

(21) Appl. No.: 17/233,605

(22) Filed: Apr. 19, 2021

(65) Prior Publication Data

US 2021/0408621 A1 Dec. 30, 2021

(30) Foreign Application Priority Data

Apr. 20, 2020 (KR) ........................ 10-2020-0047564

(51) Int. Cl.
| | |
|---|---|
| *H01M 10/6554* | (2014.01) |
| *H01M 10/613* | (2014.01) |
| *H01M 10/617* | (2014.01) |
| *H01M 10/625* | (2014.01) |
| *H01M 10/647* | (2014.01) |
| *H01M 10/653* | (2014.01) |
| *H01M 10/655* | (2014.01) |
| *H01M 10/658* | (2014.01) |
| *H01M 50/105* | (2021.01) |
| *H01M 50/183* | (2021.01) |
| *H01M 50/209* | (2021.01) |

(Continued)

(52) U.S. Cl.
CPC ..... *H01M 10/6554* (2015.04); *H01M 10/613* (2015.04); *H01M 10/617* (2015.04); *H01M 10/625* (2015.04); *H01M 10/647* (2015.04); *H01M 10/653* (2015.04); *H01M 10/655* (2015.04); *H01M 10/658* (2015.04); *H01M 50/105* (2021.01); *H01M 50/183* (2021.01); *H01M 50/209* (2021.01); *H01M 50/211* (2021.01); *H01M 50/24* (2021.01); *H01M 50/258* (2021.01); *H01M 50/534* (2021.01)

(58) Field of Classification Search
None
See application file for complete search history.

(56) References Cited

U.S. PATENT DOCUMENTS

| | | | |
|---|---|---|---|
| 2003/0068490 A1* | 4/2003 | Kaplan ................ | C08G 18/281 428/343 |
| 2010/0099015 A1* | 4/2010 | Kawai ............... | H01M 10/6568 429/62 |

(Continued)

FOREIGN PATENT DOCUMENTS

| | | |
|---|---|---|
| CN | 102458839 A | 5/2012 |
| CN | 102917574 A | 2/2013 |

(Continued)

OTHER PUBLICATIONS

Polycarbonate Diols, TrRiSO, Feb. 3, 2014 (Year: 2014).*

(Continued)

*Primary Examiner* — Ula C Ruddock
*Assistant Examiner* — Mary Grace Byram
(74) *Attorney, Agent, or Firm* — The Webb Law Firm

(57) ABSTRACT

A battery module includes a battery cell stack, on which plurality of battery cells are stacked, and a heat conduction member disposed on one surface of the battery cell stack. The heat conduction member includes a porous insulating layer and a conductive layer disposed on a surface of the porous insulating layer.

12 Claims, 8 Drawing Sheets

(51) Int. Cl.
*H01M 50/211* (2021.01)
*H01M 50/24* (2021.01)
*H01M 50/258* (2021.01)
*H01M 50/534* (2021.01)

(56) References Cited

U.S. PATENT DOCUMENTS

| | | | |
|---|---|---|---|
| 2010/0310930 A1* | 12/2010 | Park | B32B 27/304 |
| | | | 429/185 |
| 2012/0034833 A1 | 2/2012 | Schaube et al. | |
| 2012/0315482 A1* | 12/2012 | Muramatsu | C04B 35/62281 |
| | | | 977/734 |
| 2013/0309542 A1 | 11/2013 | Merriman et al. | |
| 2013/0344369 A1 | 12/2013 | Miyakawa et al. | |
| 2014/0116661 A1* | 5/2014 | Xu | G06F 1/20 |
| | | | 29/890.03 |
| 2016/0072116 A1 | 3/2016 | Yanagihara et al. | |
| 2017/0012331 A1* | 1/2017 | Ng | H01M 10/0422 |
| 2017/0104249 A1 | 4/2017 | Heeg et al. | |
| 2017/0294694 A1* | 10/2017 | Tso | H01M 10/63 |
| 2018/0138472 A1 | 5/2018 | Choi | |
| 2018/0138565 A1* | 5/2018 | Lee | H01M 10/6554 |
| 2018/0175468 A1 | 6/2018 | Shin et al. | |
| 2018/0269548 A1* | 9/2018 | Chi | B60L 50/64 |
| 2018/0287226 A1 | 10/2018 | Yoo et al. | |
| 2018/0301773 A1* | 10/2018 | Sugiyama | H01M 50/24 |
| 2019/0006642 A1 | 1/2019 | Sakaguchi et al. | |
| 2019/0103640 A1 | 4/2019 | Takabayashi et al. | |
| 2019/0198952 A1 | 6/2019 | Choi et al. | |
| 2020/0006823 A1 | 1/2020 | Chung et al. | |
| 2020/0411818 A1 | 12/2020 | Takeda | |
| 2021/0184303 A1 | 6/2021 | Lee et al. | |
| 2021/0257690 A1 | 8/2021 | Kilhenny et al. | |

FOREIGN PATENT DOCUMENTS

| | | | |
|---|---|---|---|
| CN | 106469840 | A | 3/2017 |
| CN | 107636887 | A | 1/2018 |
| CN | 107771366 | A | 3/2018 |
| CN | 109411667 | A | 3/2019 |
| CN | 109638373 | A | 4/2019 |
| CN | 110676536 | A | 1/2020 |
| EP | 2667076 | A1 | 11/2013 |
| JP | 2001356612 | A | 12/2001 |
| JP | 2017526102 | A | 9/2017 |
| JP | 2018206605 | A | 12/2018 |
| JP | 2019508632 | A | 3/2019 |
| JP | 2019110229 | A | 7/2019 |
| JP | 20209579 | A | 1/2020 |
| JP | 202047507 | A | 3/2020 |
| KR | 100580914 | B1 | 5/2006 |
| KR | 101415050 | B1 | 7/2014 |
| KR | 1020170070795 | A | 6/2017 |
| KR | 1020170084522 | A | 7/2017 |
| KR | 101960922 | B1 | 3/2019 |
| KR | 1020190078521 | A | 7/2019 |
| WO | 2014147809 | A1 | 9/2014 |
| WO | 2017106524 | A1 | 6/2017 |
| WO | 2017163336 | A1 | 9/2017 |
| WO | 2019167612 | A1 | 9/2019 |
| WO | 2021168026 | A1 | 8/2021 |

OTHER PUBLICATIONS

Machine English translation of KR101960922B1 from Espacenet originally published to Hoon Mar. 21, 2019 (Year: 2019).*
Machine English translation of JP2020047507A from Espacenet originally published to Ando Mar. 26, 2020 (Year: 2020).*
Khan Academy, What is thermal conductivity?, Khan Academy, Dec. 9, 2015 (Year: 2015).*

* cited by examiner

BATTERY MODULE

CROSS-REFERENCE TO RELATED APPLICATION

This application claims priority to Korean Patent Application No. 10-2020-0047564 filed Apr. 20, 2020, the disclosure of which is hereby incorporated by reference in its entirety.

BACKGROUND OF THE INVENTION

1. Field of the Invention

This application relates to a battery module.

2. Description of Related Art

Unlike primary batteries, secondary batteries may charge and discharge electrical energy. Thus, secondary batteries may be applied to various fields, for example, in the areas of digital cameras, mobile phones, notebook computers, hybrid vehicles, and the like. Examples of secondary batteries may include nickel-cadmium batteries, nickel-metal hydride batteries, nickel-hydrogen batteries, lithium secondary batteries, and the like.

Among such secondary batteries, a large amount of research into lithium secondary batteries having a relatively high energy density and a relatively high discharge voltage is in progress. Recently, lithium secondary batteries have been manufactured as pouched-type battery cells having flexibility. In this case, such pouched-type battery cells are provided as a plurality of pouched-type battery cell modules. The plurality of pouched-type battery cell modules may be configured to be connected and used as battery modules.

A plurality of battery modules are coupled to be manufactured as a battery pack. In the related art, only a lower portion of a battery cell is cooled to increase energy density of a battery module. As a result, the battery module according to the related art encounters a significant increase in temperature deviation in the battery cell during quick charging.

Such a temperature deviation causes the lifespan of a battery cell to be reduced.

SUMMARY OF THE INVENTION

Example embodiments of the present disclosure provide a battery module, capable of significantly reducing a temperature deviation of a battery cell.

A battery module according to example embodiments includes a battery cell stack in which a plurality of battery cells are stacked, and a heat conduction member disposed on one surface of the battery cell stack. The heat conduction member includes a porous insulating layer and a conductive layer disposed on a surface of the porous insulating layer.

In an example embodiment, the porous insulating layer may be formed of a copolymer including a first polymer segment being a hydrogen-bondable polymer segment and a second polymer segment including a polyol structure.

In an example embodiment, the first polymer segment may contain bonds of aromatic polyurethane or bonds of aromatic urea.

In an example embodiment, the second polymer segment may contain at least one aliphatic polyol selected from the group consisting of polyethylene glycol, polytetramethylene ether glycol, polypropylene glycol, polycarbonate diol, polycaprolactone diol, and an ethylene-propylene glycol copolymer.

In an example embodiment, the conductive layer may be formed of at least one selected from the group consisting of aluminum (Al), nickel (Ni), copper (Cu), silver (Ag), gold (Au), zinc (Zn), tin (Sn), and iron (Fe), or alloys thereof.

In an example embodiment, the conductive layer may be formed of at least one material selected from the group consisting of a carbon rod, spherical carbon, carbon nanotubes, and graphene.

In an example embodiment, the battery cell may include an electrode assembly and a pouch accommodating the electrode assembly and forming an exterior of the battery cell. The pouch may include an accommodation portion, accommodating the electrode assembly therein, and a sealing portion formed on an edge of the accommodation portion. The heat conduction member may has a thickness greater than a thickness of the sealing portion.

In an example embodiment, the porous insulating layer may be provided with a plurality of pores formed therein, or may be provided with a through-hole penetrating through the porous insulating layer in a thickness direction.

In an example embodiment, the conductive layer may include: a first conductive layer disposed along a surface of the porous insulating layer disposed outside the through-hole; and a second conductive layer disposed along an internal surface of the through-hole to be connected to the first conductive layer.

In an example embodiment, the battery module may further include: a first plate disposed to face one surface of the battery cell stack; and a second plate disposed to face another surface of the battery cell stack. The heat conduction member may be disposed between the battery cell stack and the second plate.

In an example embodiment, the battery cell may include an electrode assembly and a pouch accommodating the electrode assembly and forming an exterior of the battery cell. The pouch may include an accommodation portion, accommodating the electrode assembly therein, and a sealing portion formed on an edge of the accommodation portion. The heat conduction member may be attached to a plurality of battery cells along a surface formed by the accommodation portion and the sealing portion.

In an example embodiment, the sealing portion may be disposed in such a manner that one surface of the sealing portion faces one surface of the accommodation portion, and the other surface of the sealing portion faces the second plate. The heat conduction member may include a first heat conduction member disposed on the other surface of the sealing portion, a second heat conduction member disposed on one surface of the sealing portion, and a third heat conduction member disposed on a surface of the accommodation portion facing the one surface of the sealing portion. The first to third heat conduction members may be compressed in a thickness direction to be disposed between the second plate and the battery cell stack.

In an example embodiment, the heat conduction member may have shrinkage of 90% or less in the thickness direction.

In an example embodiment, the heat conduction member may have a thickness of 100 μm to 500 μm.

In an example embodiment, the battery module may further include a cooling device coupled to the second plate.

In an example embodiment, the heat conduction member may have an elongation rate of 10% or less in a thickness direction.

BRIEF DESCRIPTION OF DRAWINGS

The above and other aspects, features, and advantages of the present disclosure will be more clearly understood from the following detailed description, taken in conjunction with the accompanying drawings.

DESCRIPTION OF THE INVENTION

Figure 1:
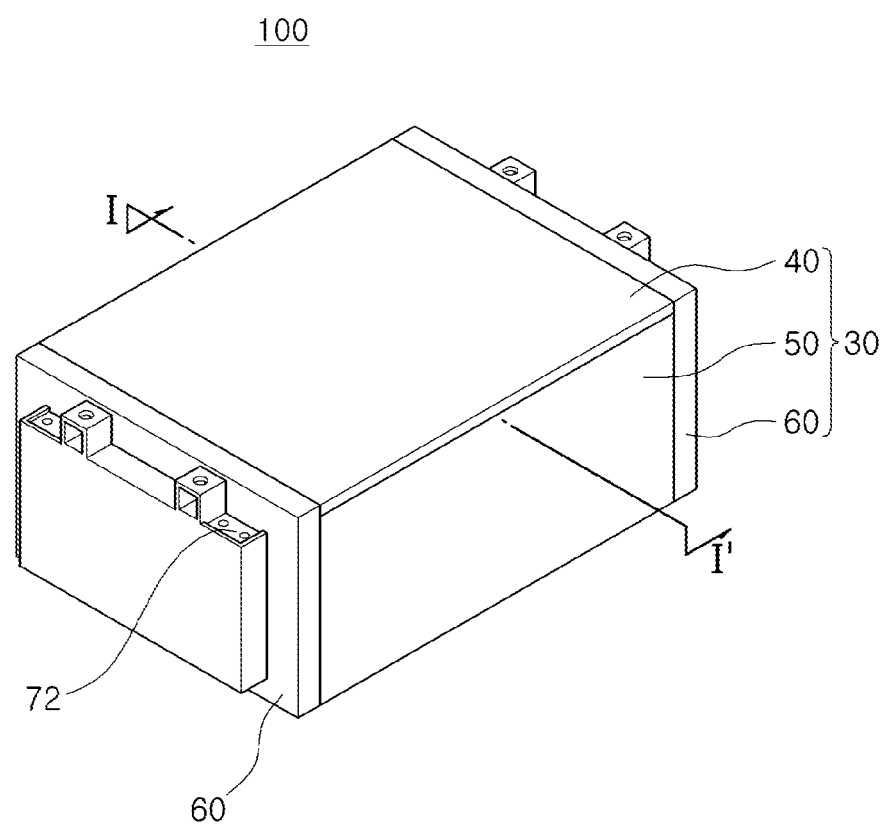
FIG. 1 is a schematic perspective view of a battery module according to an example embodiment of the present disclosure.

Prior to the description, it should be understood that the terms used in the specification and the appended claims should not be construed as being limited to general and dictionary meanings, but should be interpreted based on the meanings and concepts corresponding to technical aspects of the present disclosure on the basis of the principle that the inventor is allowed to define terms appropriately for the best explanation. Therefore, the configurations described in the following description with reference the accompanying drawings do not represent all technical concepts or ideas of the present disclosure but should be considered to be exemplary embodiments of the present disclosure. It should be understood that various modifications and equivalents of the embodiments may be devised within the scope of the present invention at the time of the filing of the application.

Hereinafter, example embodiments of the present disclosure will be described in detail with reference to the accompanying drawings. In the drawings, the same elements are denoted by the same reference numerals as much as possible. Furthermore, detailed descriptions related to well-known functions or configurations may be omitted in order not to unnecessarily obscure subject matters of the present disclosure. For the same reason, some of the elements in the accompanying drawings are exaggerated, omitted, or shown schematically, and the size of each element may not entirely reflect the actual size.

Figure 2:
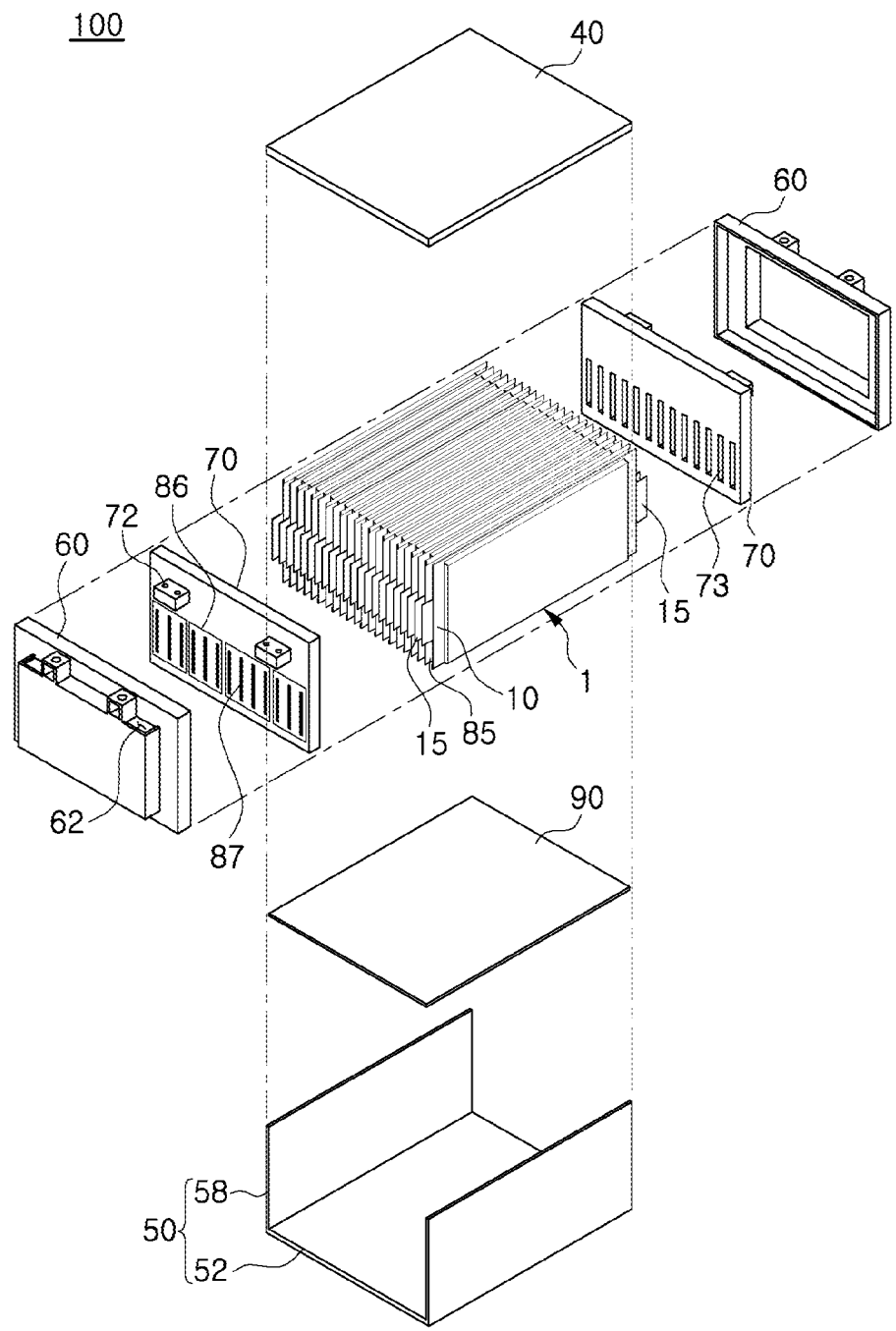
FIG. 2 is an exploded perspective view of the battery module illustrated in FIG. 1.
Figure 3:
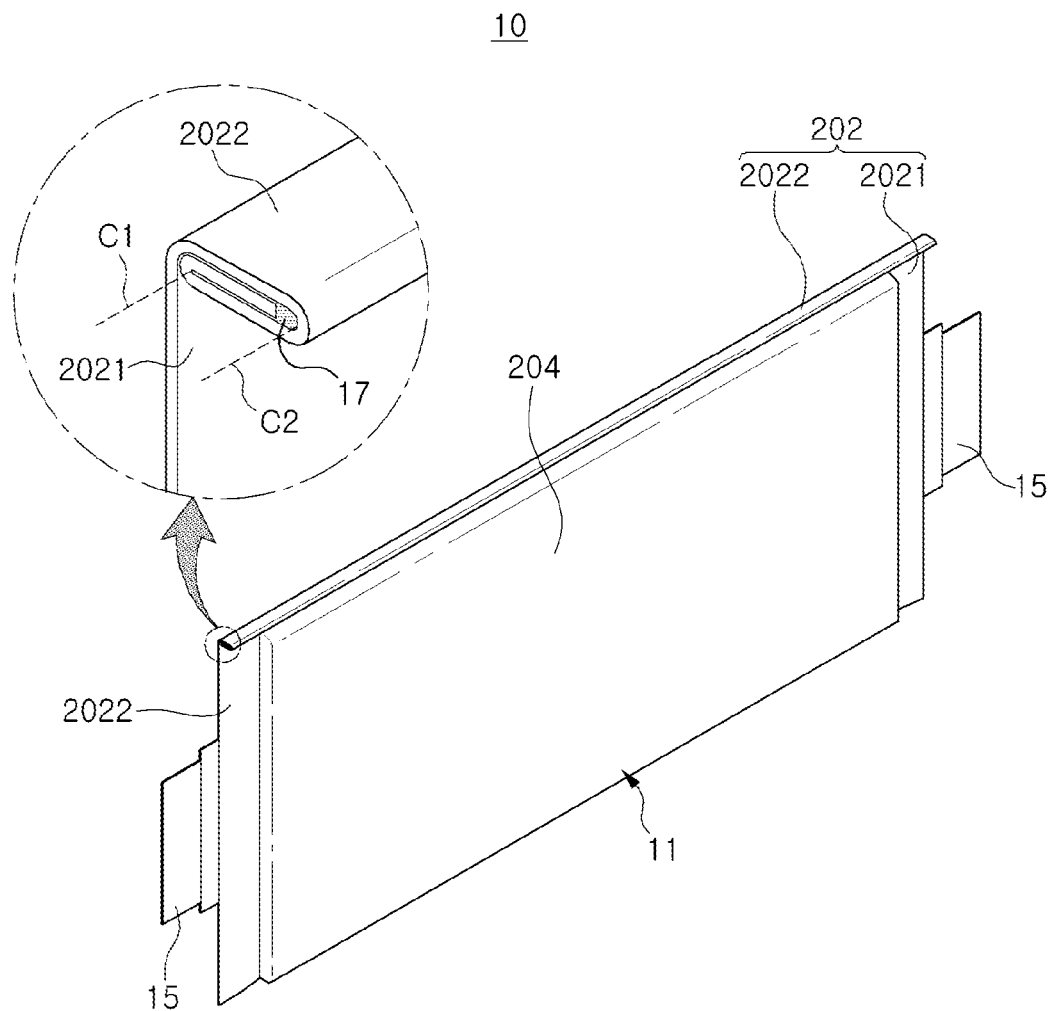
FIG. 3 is an exploded perspective view of a battery cell illustrated in FIG. 2.
Figure 4:
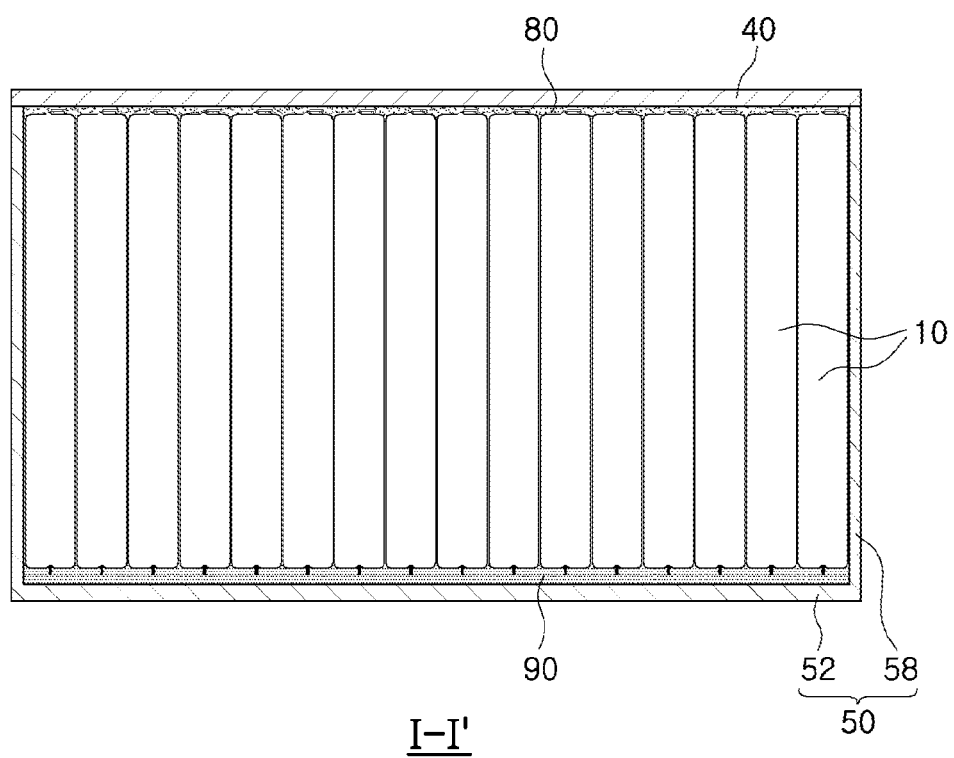
FIG. 4 is a cross-sectional view taken along line I-I' in FIG. 1.
Figure 5:
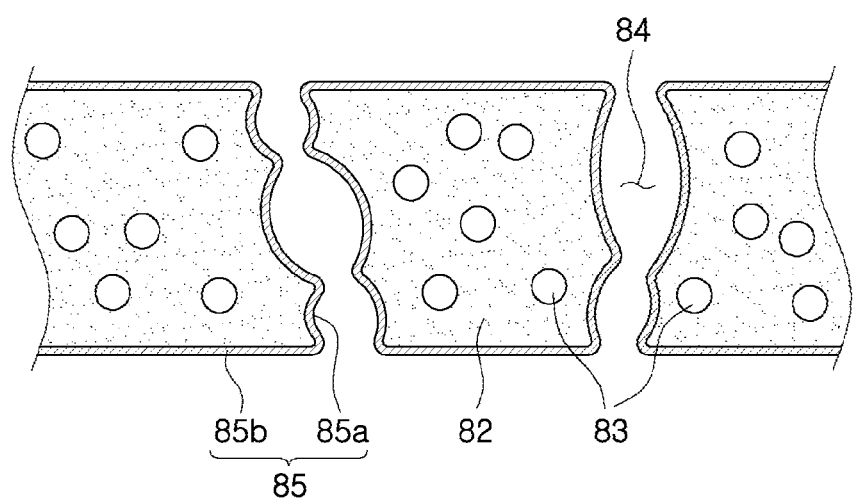
FIG. 5 is a schematic cross-sectional view of a heat conducting member according to an example embodiment of the present disclosure.

FIG. 1 is a schematic perspective view of a battery module according to an example embodiment, FIG. 2 is an exploded perspective view of the battery module illustrated in FIG. 1, and FIG. 3 is an exploded perspective view of a battery cell illustrated in FIG. 2. FIG. 4 is a cross-sectional view taken along line I-I' in FIG. 1, and FIG. 5 is a schematic cross-sectional view of a heat conducting member according to an example embodiment.

Referring to FIGS. 1 to 5, a battery module 100 may include a battery cell stack 1, a case 30, an insulating cover 70, a side cover 60, a heat transfer layer 90, and a heat conducting member 80.

The battery cell stack 1 may be formed by stacking a plurality of battery cells 10 illustrated in FIG. 3. In the present embodiment, the battery cells 10 may be layered in a horizontal direction. However, the battery cells 10 may be configured to be layered in a vertical direction, as necessary.

Each of the battery cells 10 may be a pouch-type secondary battery, and may have a structure in which electrode leads 15 protrude externally.

The battery cell 10 may have a configuration in which an electrode assembly, not illustrated, is accommodated in a pouch 11.

The electrode assembly may include a plurality of electrode plates and a plurality of electrode tabs, and may be accommodated in the pouch 11. Each of the electrode plates may include a positive electrode plate and a negative electrode plate, and the electrode assembly may have a configuration in which the positive electrode plate and the negative electrode plate are stacked such that relatively large surfaces oppose each other with a separator interposed therebetween.

The positive electrode plate and the negative electrode plate may be formed to have structure in which an active material slurry is coated on a current collector. The slurry may be formed by stirring a granular active material, an auxiliary conductor, a binder, a plasticizer, and the like, in a state in which a solvent is added.

In the electrode assembly, a plurality of positive electrode plates and a plurality of negative electrode plates may be vertically stacked. In this case, the plurality of positive electrode plates and the plurality of negative electrode plates may be provided with electrode tabs, respectively, and may be in contact with each other with the same polarity to be in connected to the same electrode lead 15.

In the present embodiment, two electrode leads 15 may be disposed in opposing directions.

The pouch 11 may be formed to have a container shape to form an exterior of the battery cell 10, and may provide an internal space in which the electrode assembly and electrolyte, not illustrated, are accommodated. In this case, a portion of the electrode lead 15 of the electrode assembly may be exposed outwardly of the pouch 11.

The pouch 11 may be divided into a sealing portion 202 and an accommodation portion 204.

The accommodation portion 204 may be formed to have a container shape to provide a rectangular internal space. The electrode assembly and the electrolyte may be accommodated in the internal space of the accommodation portion 204.

The sealing portion 202 may be a portion to which a portion of the pouch 11 is bonded to seal the circumference of the accommodation portion 204. Therefore, the sealing portion 202 may be formed to have a shape of flange extending outwardly of the accommodation portion 204 formed to have a container shape. Thus, the sealing portion 202 may be disposed along an edge of the accommodation portion 204.

A method of bonding the pouch 11 may be thermal fusion bonding, but the present disclosure is not limited thereto.

In the present embodiment, the sealing portion 202 may be divided into a first sealing portion 2021, in which the electrode leads 15 are disposed, and a second sealing portion 2022 in which the electrode leads 15 are not disposed.

In the present embodiment, the pouch 11 may be formed by forming a single exterior material. More specifically, the pouch 11 may be completed by forming one or two accommodation portions on the single exterior material and folding the exterior material such that the accommodation portions form a single space (for example, an accommodation portion).

In the present embodiment, the accommodation portion 204 may be formed to have a rectangular shape. In addition, an edge of the accommodation portion may be provided with a sealing portion 202 formed by bonding an exterior material. Therefore, in the battery cell 10 of the present embodiment, the sealing portion 202 does not need to be formed on a surface on which the exterior material is folded. Accordingly, in the present embodiment, the sealing portions 202 may be provided on each of the three surfaces, among four surfaces constituting the edge of the accommodation portion 204, but may not be provided on one surface (a lower surface in FIG. 3), among the four surfaces constituting the edge of the accommodation portion 204.

In the present embodiment, since the electrode leads 15 are disposed in opposing directions, the two electrode leads 15 may be disposed on sealing portions 202 formed on different sides. Accordingly, the sealing portion 202 may include two first sealing portions 2021, in which the electrode leads 15 are disposed, and one second sealing portion 2022 in which the electrode leads 15 are not disposed.

The battery cell 10 may constitute the sealing portion 202 while being folded at least once to improve bonding reliability of the sealing portion 202 and to significantly reduce a volume of the sealing portion 202 in a module of the sealing portion 202.

More specifically, the battery cell 10 may be configured such that only the second sealing portion 2022 (in which the electrode leads 15 are not disposed) of the sealing portions 202 is folded twice.

The second sealing portion 2022 may be folded in a direction in which an area of a battery cell is reduced. For example, bending lines C1 and C2, lines on which the second sealing portion 2022 is folded, may be disposed parallel to the edge of the accommodation portion 204, and the second sealing portion 2022 may be folded in such a manner that at least a portion of the second sealing portion 2022 overlaps along the bending lines C1 and C2. Accordingly, the second sealing portion 2022 folded at least once may have the same width overall.

The second sealing portion 2022 may be folded 180 degrees along the second bending line C2 illustrated in FIG. 3, and then folded at 90 degrees along the first bending line C1 illustrated in FIG. 3.

In this case, a bonding member 17 may fill the interior of the second sealing portion 2022. Thus, a twice-folded shape of the sealing portion may be maintained by the bonding member 17. The bonding member 17 may be formed of an adhesive having high thermal conductivity. For example, the bonding member 17 may be formed of epoxy or silicone, but the present disclosure is not limited thereto.

In the present embodiment, the bonding member 17 may be formed of the same material as or different material from the heat transfer layer 90 to be described later.

The above-configured battery cell 10 may be a chargeable and dischargeable cell, in detail, a lithium ion (Li-ion) cell or a nickel metal hydride (Ni-MH) cell.

The battery cells 10 may be disposed to be horizontally stacked while standing upright in the case 30 to be described later. In addition, at least one buffer pad, not illustrated, may be disposed between the battery cells 10 disposed to be stacked and between the battery cell stack 10 and the case 30.

A single buffer pad or a plurality of buffer pads may be disposed between the accommodation portions 204 of the battery cells 10.

The buffer pad may be compressed and elastically deformed when a specific battery cell 10 expands. Accordingly, overall volume expansion of the battery cell stack 1 may be suppressed. To this end, the buffer pad may be formed of a polyurethane foam, but the present disclosure is not limited thereto. In addition, the buffer pad may be omitted to increase energy density of a battery cell.

The case 30 may define the exterior of the battery module 100, and may be disposed outside of the plurality of battery cells 10 to protect the battery cells 10 from an external environment. In addition, the case 30 may be used as a heat dissipation member of a battery module.

The case 30 may include a first plate 50 disposed on one side of the battery cell stack 1, a second plate 40 disposed on the other side of the battery cells 10, and a side cover 60 disposed on a side surfaced on which the electrode leads 15 of the battery cells 10 are disposed.

The first plate 50 may include a lower plate 52, disposed below the battery cell stack 1 to support a lower surface of the battery cell stack 1, and side plates 58 supporting side surfaces of the battery cell stack 1. However, the side plates 58 and the lower plate 52 may be configured as independent components, as necessary.

The side plates 58 may be formed to extend from both sides of the lower plate 52, and may support the battery cells 10 disposed on both sides of the battery cell stack 1 disposed to be stacked in a horizontal direction.

The side plate 58 may be configured to be in direct contact with the accommodation portion 204 of the battery cell to securely support the battery cell 10. However, the present disclosure is not limited thereto, and various modifications may be made, as necessary. For example, a thermal pad or a buffer pad may be interposed between the side plate 58 and the accommodation portion 204.

The above-configured first plate 50 may be formed of a material having high thermal conductivity such as a metal. For example, the first plate 50 may be formed of aluminum. However, the present disclosure is not limited thereto, and various non-metallic materials may be used as long as they have thermal conductivity similar to thermal conductivity of the metal.

The second plate 40 may be disposed above the battery cell stack 1 to face an upper surface of the battery cell stack 1. In addition, the second plate 40 may be provided in the form of a flat plate to be fastened to an upper end of the side plate 58 of the first plate 50. Accordingly, when the second plate 40 is fastened to the first plate 50, the second plate 40 and the first plate 50 may have a shape of a hollow pipe member.

Similarly to the first plate 50, the second plate 40 may be formed of a material having high thermal conductivity. The second plate 40 may be formed of, in detail, a metal and, in more detail, aluminum. However, the present disclosure is not limited thereto, and various materials may be used within the scope of the present disclosure as long as they have high thermal conductivity.

The first plate 50 and the second plate 40 may be coupled by welding, or the like. However, the present disclosure is not limited thereto, and various modifications may be made. For example, the first plate 50 and the second plate 40 may be coupled in a sliding manner or may be coupled using a fixing member such as a bolt, a screw, or the like.

The side cover 60 may be coupled to both sides of the battery cells 10 on which the electrode leads 15 are disposed.

As illustrated in FIG. 2, the side cover 60 may be coupled to the first plate 50 and the second plate 40 to constitute an external surface of the battery module 100 together with the first plate 50 and the second plate 40.

The side cover 60 may be formed of an insulating material such as a resin, and may include a through-hole 62 through which a connection terminal 72 of the insulating cover 70 to be described later is exposed externally.

The side cover 60 may be coupled to the first plate 50 and the second plate 40 through a fixing member such as a screw, a bolt, or the like. However, the present disclosure is not limited thereto.

The insulating cover 70 may be interposed between the side cover 60 and the battery cell stack 1.

The insulating cover 70 may be coupled to one surface of the battery cells 10 on which the electrode leads 15 are disposed. Therefore, the electrode leads 15 may penetrate through the insulation cover 70 to be connected to each other in an external side of the insulation cover 70. To this end, the insulating cover 70 may be provided with a plurality of through-holes 73 into which the electrode leads 15 are inserted.

In addition, the insulating cover 70 may be provided with a connection terminal 72 to electrically connect the battery cells 10 to an external component. The connection terminal 72 may be exposed externally through the through-hole 62 formed in the side cover 60. Accordingly, the through-hole 62 of the side cover 60 may be formed to have a shape corresponding to a size and a shape of the connection terminal 72.

In the present embodiment, the connection terminal 72 may include a conductive member, and may be electrically connected to at least one bus bar 86 or may be bonded to at least one bus bar 86.

In addition, the insulating cover 70 may include a circuit board (for example, a printed circuit board (PCB)) and a plurality of electronic components mounted on the circuit board, and may serve to sense a voltage of the battery cell 10 through the circuit board and the electronic components.

The bus bar 86 may be formed to have a metal plate shape, and may be coupled to an external surface of the insulating cover 70. The battery cells 10 may be electrically connected to each other through the bus bar 86, and may be electrically connected to an external component of the battery module by means of the bus bar 86 and the connection terminal 72.

To this end, the bus bar 86 may be provided with a plurality of through-holes 87 into which the electrode leads 15 are inserted, and the electrode leads 15 may be inserted into the through-holes 87 of the bus bar 86 and then bonded to the bus bar 86 using a method such as welding, or the like. Accordingly, at least a portion of an end of the electrode lead 15 may completely penetrate through the bus bar 86 to be exposed outwardly of the bus bar 86.

In the present embodiment, the connection terminal 72 includes a member manufactured independently of the bus bar 86, but the present disclosure is not limited thereto, and the connection terminal 72 may be integrated with the bus bar 86. In addition, various modifications of the present embodiment may be made. For example, the bus bar 86 may be formed in such a manner that a portion of one side of the bus bar 86 protrudes, and then the protruding portion may be bent to be used as the connection terminal 72.

A heat transfer layer 90 may be disposed between the lower surface of the battery cell stack 1 and the first plate 50.

The heat transfer layer 90 may rapidly transfer heat, generated by the battery cell 10, to the case 30. To this end, the heat transfer layer 90 may be formed of a material having high thermal conductivity. For example, the heat transfer layer 90 may be formed of one of thermal grease, a thermal adhesive, an epoxy resin, and a thermal pad, but the present disclosure is not limited thereto.

The heat transfer layer 90 may be disposed on an internal surface of the case 30 in the form of a pad, or may be applied to the internal surface of the case 30 in a liquid or gel state to be formed.

The heat transfer layer 90 may have high insulating properties and may employ, for example, a material having dielectric strength ranging from 10 KV/mm to 30 KV/mm.

Accordingly, the battery module 100 may allow insulation between the battery cell 10 and the case 30 to be maintained by the heat transfer layer 90, disposed around the battery cell 10, even when insulation is partially damaged in the battery cell.

In addition, since the heat transfer layer 90 is disposed to fill a space between the battery cells 10 and the case 30, overall rigidity of the battery module 100 may be improved.

In the present embodiment, a description has been provided as to a case in which the heat transfer layer 90 is disposed below the battery cell 10 only. However, the present disclosure is not limited thereto, and various modifications may be made. For example, the heat transfer layer 90 may be additionally disposed between the battery cell stack 1 and the side plate 58, as necessary.

The battery module 100 may dissipate heat to an external entity through the lower plate 52 and the second plate 40. Therefore, the lower plate 52 and the second plate 40 may serve as heat dissipating members to dissipate heat to the external entity.

To this end, the battery module 100 may be provided with a heat conduction member 80 disposed between the battery cell stack 1 and the second plate 40.

The heat conduction member 80 may include a porous insulating layer 82 and a conductive layer 85.

A plurality of pores 83 may be formed in the porous insulating layer 82. In addition, the plurality of pores 83 may be connected to each other to form a through-hole 84 penetrating through the porous insulating layer 82 in a thickness direction. Such through-holes 84 may be uniformly disposed throughout the porous insulating layer 82.

The term "thickness direction" may refer to a direction in which a through-hole penetrates through both wide surfaces of the porous insulating layer 82 or the heat conduction member 80 provided in the form of a sheet. Therefore, the thickness direction may include not only a direction, orthogonal to the above-described both surfaces, but also a direction in which the through-hole obliquely penetrates through the both surfaces.

According to an example embodiment, the conductive layer 85 may be formed of a material having high thermal conductivity, and may be disposed on the entire surface of the porous insulating layer 82. Specifically, the conductive layer 85 may include a first conductive layer 85*b*, disposed on both wide surfaces of the porous insulating layer 82, for example, an external surface of the through-hole 84, and a second conductive layer 85*a* disposed on an internal surface of the through-hole 84. The second conductive layers 85*a*, disposed on the internal surface of the through-hole 84, may connect the first conductive layers 85*b*, disposed on both surfaces of the porous insulating layer 82, to each other.

The heat conduction member 80 may provide high thermal conductivity through the conductive layer 85. Thus, heat generated by the battery cell 10 may be rapidly transferred to the second plate 40 through the conductive layer 85.

According to an example embodiment, the porous insulating layer 82 may be formed of a stretchable polymer. Thus, the heat conduction member 80 may provide high compressibility and high stretchability.

Accordingly, when the heat conduction member 80 is disposed between the battery cell stack 1 and the second plate 40, the heat conduction member 80 may fill an entire space between the battery cell stack 1 and the second plate 40.

The porous insulating layer 82 may be formed of a copolymer including a first polymer segment being a hydrogen-bondable polymer segment and a second polymer segment including a polyol structure.

The first polymer segment may contain bonds of aromatic polyurethane and aromatic urea, and the second polymer segment may contain at least one aliphatic polyol selected from the group consisting of polyethylene glycol, polytetramethylene ether glycol, polypropylene glycol, polycarbonate diol, polycaprolactone diol, and an ethylene-propylene glycol copolymer.

The conductive layer 85 may be formed of a metal or conductive carbon.

A metal, used to form the conductive layer 85, may be at least one selected from the group consisting of Al, Ni, Cu, Ag, Au, Zn, Sn, and Fe, or alloys thereof. In addition, the conductive carbon may be at least one selected from the group consisting of a carbon rod, spherical carbon, carbon nanotubes, graphene, and the like.

The heat conduction member 80 may be disposed on a side of the second sealing portion 2022 of the battery cell 10. More specifically, as illustrated in FIG. 5, the heat conduction member 80 may be disposed on an entire one side surface of the battery cell 10 on which the second sealing portion 2022 is disposed, and may be attached to the battery cell 10 to cover the second sealing portion 2022 on a surface formed by the accommodation portion 204 and the second sealing portion 2022. Accordingly, the heat generated by the battery cell 10 may be transferred to the heat conduction member 80 and the second plate 40 through the entire surface of the battery cell 10 on which the second sealing portion 2022 is disposed.

During coupling of the second plate 40 to the first plate 50 in a process of manufacturing the battery module 100 to be described later, the heat conduction member 80 may be pressed by the second plate 40. As described above, since the heat conduction member 80 includes the stretchable porous insulating layer 82, the heat conduction member 80 may be compressed and elastically deformed when the second plate 40 presses the heat conduction member 80.

The above-configured battery module 100 may include the above-described heat conduction member 80 to secure not only thermal conductivity but also high elasticity. Accordingly, the heat conduction member 80 may completely fill the space between the battery cell stack 1 and the second plate 40 to significantly increase a heat conduction effect.

In addition, since the second conductive layer 85a may be disposed on not only an external surface of the porous insulating layer 82 but also an internal surface of the through-hole of the porous insulating layer 82 to connect the first conductive layers 85b, disposed on the external surface of the porous insulating layer 82, to each other, high thermal conductivity may be provided. Accordingly, heat generated by the battery cell 10, attached to one surface of the heat conduction member 80, may be rapidly transferred to the second plate 40 through the conductive layer 85.

FIGS. 6A to 6D are views illustrating processes of coupling a second plate to a first plate, and sequentially illustrate processes in which the heat conduction member 80 is elastically deformed.

Figure 6A:
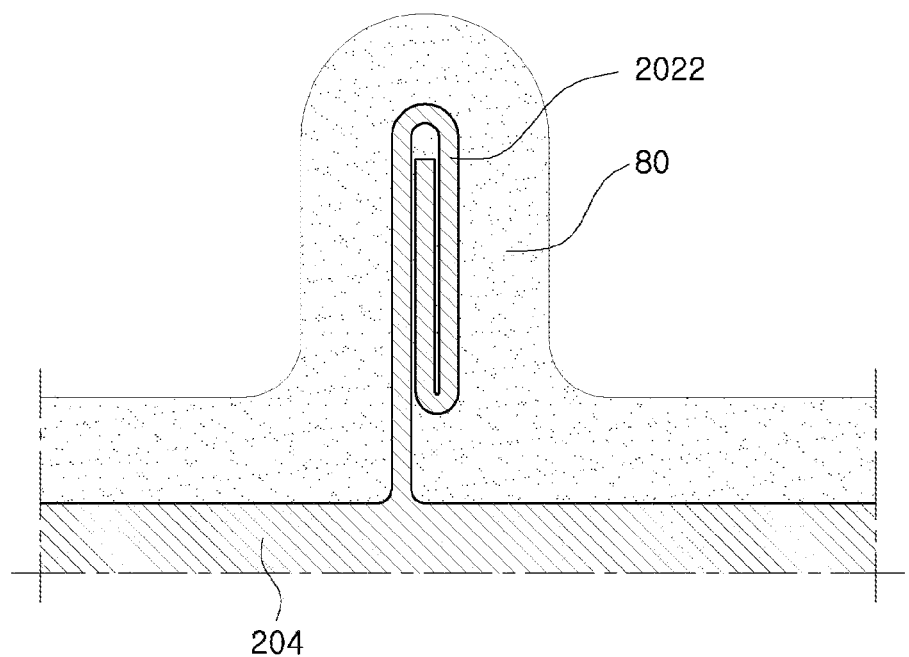
FIGS. 6A to 6D are views illustrating processes of coupling a second plate to a first plate.

As illustrated in FIG. 6A, the heat conduction member 80 may be attached to one surface of the battery cell stack 1. The heat conduction member 80 may be attached on a surface formed by the second sealing portion 2022 and one surface of the accommodation portion 204.

In an example embodiment, the heat conduction member 80 may be provided in the form of a sheet to be attached to the battery cell stack 1. In addition, as illustrated in FIG. 5, the heat conduction member 80 may include a plurality of through-holes 84, disposed overall in the porous insulating layer 82, and a conductive layer 85 disposed on an internal wall of each of the through-holes 84 and both surfaces of the porous insulating layer 82.

Figure 6B:
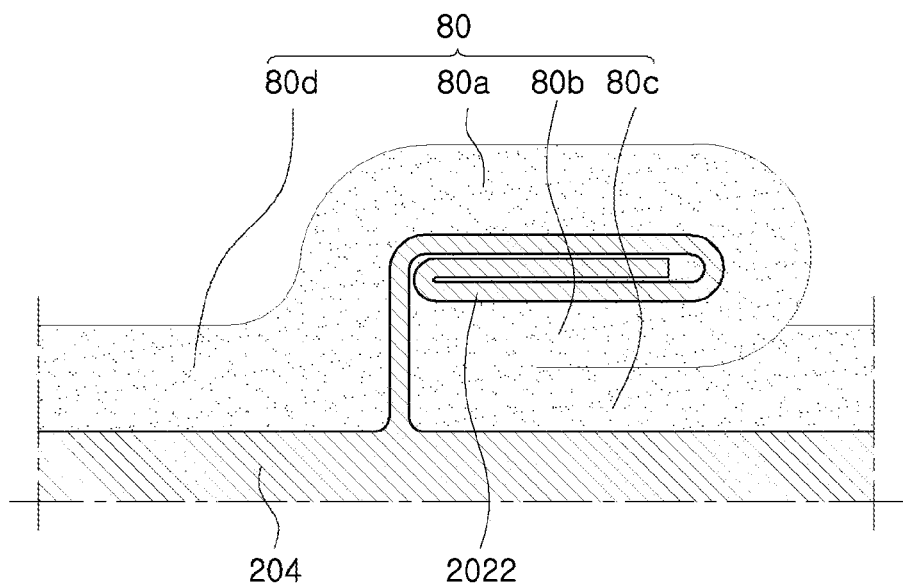

As illustrated in FIG. 6B, the second sealing portion 2022 may be folded to be parallel to one surface of the accommodation portion 204. In this case, the heat conduction member 80 may be compressed to a predetermined thickness.

For ease of description, the heat conduction member 80 will be described while being divided into first and second conduction members 80a and 80b, disposed on a surface of the second sealing portion 2022, and third and fourth heat conduction members 80c and 80d disposed on a surface of the accommodation portion 204. The first heat conduction member 80a and the second heat conduction member 80b may disposed on different surfaces of the second sealing portion 2022, respectively, and the third heat conduction member 80c and the fourth heat conduction member 80d may be distinguished by the sealing portion 2022 as a boundary therebetween.

Then, the second plate 40 may be coupled to the first plate.

Figure 6C:
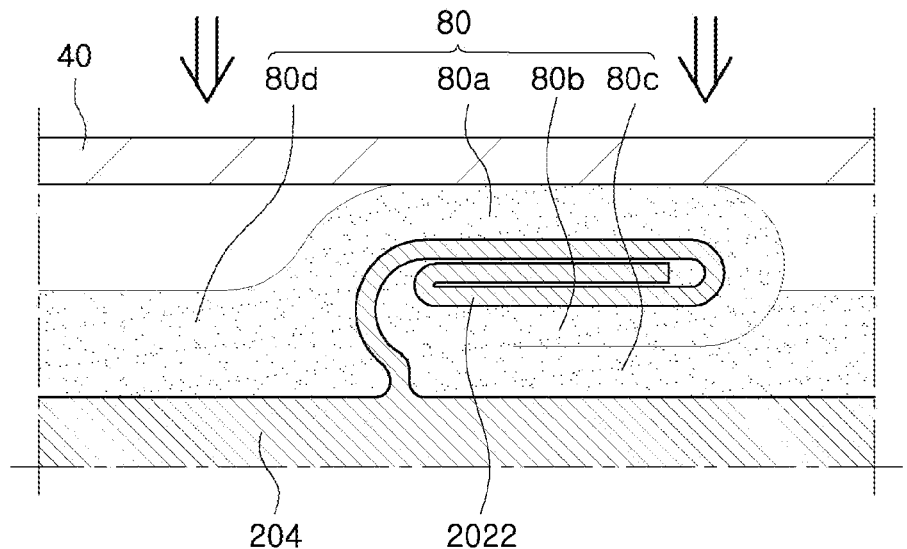

As illustrated in FIG. 6C, the second plate 40 may be brought into contact with the first heat conduction member 80a, disposed on the other surface of the second sealing portion 2022, and then may press the first heat conduction member 80a.

In this case, one surface of the second sealing portion 2022 may face one surface of the accommodation portion 204, and the other surface of the second sealing portion 2022 may face the second plate 40. The first heat conduction member 80a, disposed on the other surface of the second sealing portion 2022, may be disposed to be contact with the second plate 40, and the second heat conduction member 80b, disposed on the one surface of the second sealing portion 2022, may be disposed to overlap the third heat conduction member 80c.

Accordingly, when the first heat conduction member 80a is pressed by the second plate 40, the second heat conduction member 80b, disposed on the one surface of the second sealing portion 2022 together with the first heat conduction member 80a, and the third heat conduction member 80c may also be compressed in a thickness direction.

Figure 6D:
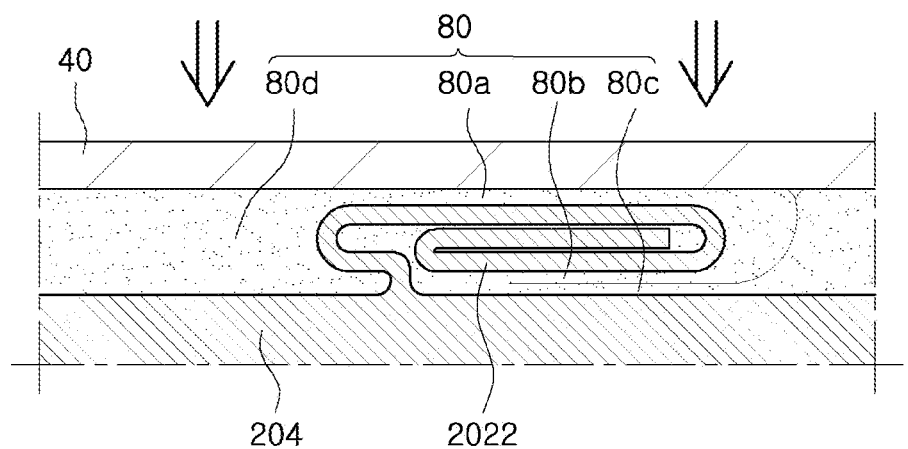

When the second plate 40 is completely coupled to the first plate 50, the second plate 40 may be brought into contact with a fourth heat conduction member 80d disposed on one surface of the accommodation portion 204, as illustrated in FIG. 6D. Accordingly, the second plate 40 may be brought into contact with both the first heat conduction member 80a and the fourth heat conduction member 80d, and the first to third heat conduction members 80a, 80b, and 80c may be pressed to be maintained in an elastically deformed state.

According to an example embodiment, the heat conduction member 80 may have shrinkage of 90% or less in the thickness direction. For example, the heat conduction member 80 may be compressed to one-tenth (1/10) thickness, as compared with a thickness before being compressed. Accordingly, even when the first to third heat conduction members 80a, 80b, and 80c are compressed in a state in which they overlap each other, they may be maintained in a state in which a thickness thereof is less than a thickness of the fourth heat conduction member 80d.

In addition, when an elongation rate of the heat conduction member 80 is greater than 10%, cracking may occur in the conductive layer 85 to deteriorate heat conduction efficiency. Therefore, according to an example embodiment, the heat conduction member 80 may have an elongation rate of 10% or less.

The heat conduction member 80 may have a thickness of 100 μm to 500 μm. In an example embodiment, the second sealing portion 2022 may be formed to have a thickness of about 70 μm or more. In this case, the heat conduction member 80 should have a greater thickness than the second sealing portion 2022. In the present embodiment, the heat conduction member 80 may have a thickness of 100 μm or more because the thicknesses of the first to third heat conduction members 80a, 80b, and 80c are taken into account.

In an example embodiment, when the thickness of the heat conduction member 80 is greater than 50 μm, a separation distance between the battery cell stack 1 and the second plate 40 may be significantly increased. In this case, heat transfer efficiency may be deteriorated, and a volume of the battery module 100 may be increased. Moreover, based on FIG. 6A, the heat conduction member 80 may significantly protrude upwardly of the second sealing portion 2022. Therefore, interference may occur between the protruding portion and a second sealing portion of another adjacent battery cell when the second sealing portion 2022 is pressed.

Accordingly, in the present embodiment, the heat conduction member 80 may formed to have a thickness of 500 μm or less.

The heat conduction member 80 may be bonded to the battery cell 10 by means of an adhesive, or the like. However, the present disclosure is not limited thereto, and various known methods such as heat sealing or UV bonding may be used.

When the above-configured heat conduction member 80 is provided, heat concentrated on an upper portion of the battery cell 10 may be rapidly dissipated to the second plate 40 through the heat conduction member 80. Accordingly, the battery cell 10 may be rapidly cooled to significantly reduce temperature deviation of the battery cell 10.

In addition, as the heat conduction member 80 is elastically deformed, a distance between the second plate 40 and the battery cell 10 may be significantly reduced even when the heat conduction member 80 is interposed between the second plate 40 and the battery cell 10. Accordingly, a size of the battery module 100 may be significantly reduced.

The present disclosure is not limited to the above-described embodiment, and various modifications may be made.

Figure 7:
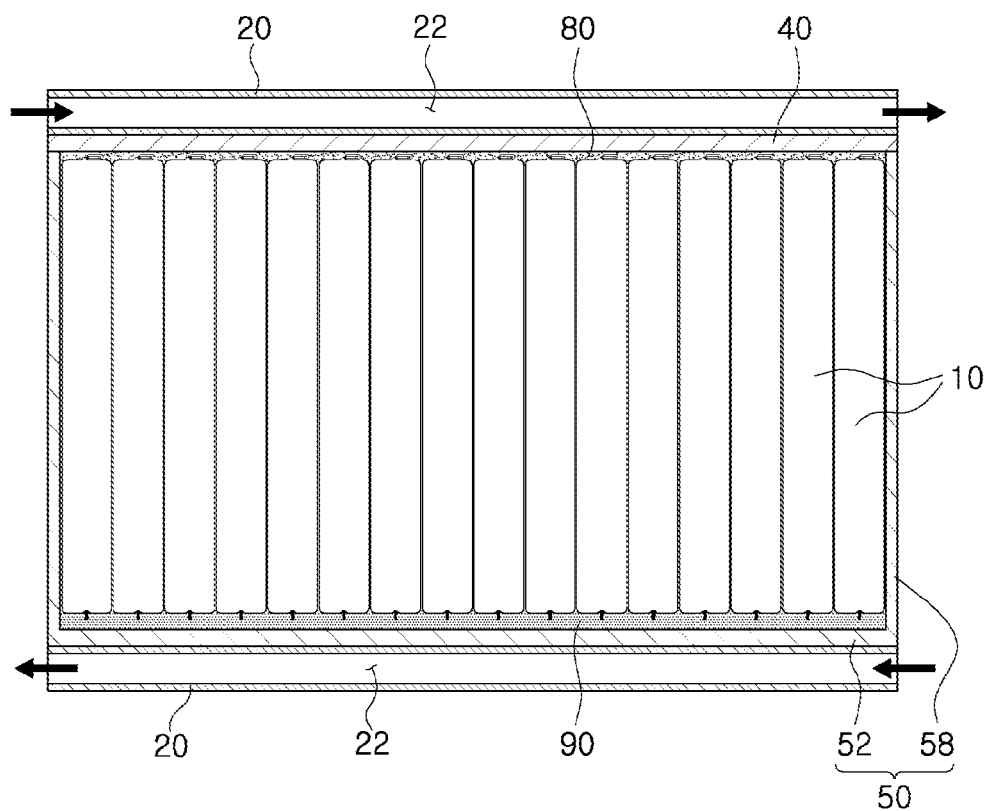
FIG. 7 is a cross-sectional view of a battery cell stack according to another example embodiment of the present disclosure.

FIG. 7 is a cross-sectional view of a battery cell stack according to another example embodiment, and illustrates a cross section taken along line I-I of FIG. 1.

Referring to FIG. 7, a battery module may include at least one cooling device 20.

In the battery module, the cooling device 20 may be coupled to each of a lower surface of a first plate 50 and an upper surface of a second plate 40.

In the battery module illustrated in FIG. 7, the cooling device 20 may be coupled to both the lower surface of the first plate 50 and the upper surface of the second plate 40 to effectively dissipate heat. However, the present disclosure is not limited thereto, and various modifications may be made. For example, a cooling device may only be disposed one surface or may be additionally disposed in various positions, depending on a structure of a battery module or a structure of a device in which a battery module is mounted.

According to an example embodiment, the cooling device 20 may be provided with a cooling passage 22 formed therein. Specifically, the cooling passage 22 may be a water-cooled cooling passage or an air-cooled cooling passage, but the present disclosure is not limited thereto.

The cooling device 20 may be integrally coupled to a case 30 to be included in the battery module. For example, the cooling device 20 may be coupled to the second plate 40, disposed above a battery cell 10, and a lower plate 52 disposed below the battery cell 10. However, the present disclosure is not limited thereto, and a cooling device may be disposed in a device or a structure in which the battery module is mounted, independently of the battery module.

In addition, although not illustrated in the drawing, a thermal pad may be disposed between the first plate 50 or the second plate 40 and the cooling device 20 to effectively transfer heat.

As described above, in a battery module according to an example embodiment, heat concentrated on an upper portion of a battery cell may be rapidly dissipated to a heat dissipation member through a heat conduction member. Thus, the battery cell may be rapidly cooled to significantly reduce temperature deviation of the battery cell.

While this disclosure includes specific examples, it will be apparent after an understanding of the disclosure of this application that various changes in forms and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A battery module comprising:
    a battery cell stack in which a plurality of battery cells are stacked; and
    a heat conduction member disposed on one surface of the battery cell stack,
    wherein the heat conduction member comprises a porous insulating layer and a conductive layer disposed on a surface of the porous insulating layer,
    a through-hole penetrates through the porous insulating layer in a thickness direction, and
    the conductive layer comprises:
    a first conductive layer disposed on a surface of the porous insulating layer disposed outside of the through-hole; and
    a second conductive layer disposed on an internal surface of the through-hole to be connected to the first conductive layer, wherein each battery cell of the plurality of battery cells comprises an electrode assembly and a pouch accommodating the electrode assembly and forming an exterior of the battery cell, wherein the pouch comprises an accommodation portion, accommodating the electrode assembly therein, and a sealing portion formed on an edge of the accommodation portion, and wherein the sealing portion includes a first sealing portion in which an electrode lead is disposed, and a second sealing portion at least partially folded, the battery module further comprises a heat dissipation member disposed to face the second sealing portion, wherein the heat conduction member is disposed between the battery cell and the heat dissipation member, and attached to the accommodation portion and the second sealing portion, wherein the battery module further comprises a first plate disposed to face one surface of the battery cell stack, and a second plate disposed to face another surface of the battery cell stack, wherein the heat conduction member is disposed between the battery cell stack and the second plate, wherein the heat conduction member is attached to a plurality of battery cells on a surface formed by the accommodation portion and the sealing portion, wherein the sealing portion is disposed between the accommodation portion and the second plate, a first surface of the sealing portion faces one surface of the accommodation portion, and a second surface of the sealing portion, opposing the first surface, faces the second plate, and wherein the heat conduction member comprises a first heat conduction member disposed on the second surface of the sealing portion, a second heat conduction member disposed on the first surface of the sealing portion, and a third heat conduction member disposed on the one surface of the accommodation portion facing the first surface of the sealing portion, and the first to third heat conduction members are compressed in a thickness direction to be disposed between the second plate and the battery cell stack.

2. The battery module of claim 1, wherein the porous insulating layer is formed of a copolymer polymer comprising a first polymer segment being a hydrogen-bondable polymer segment and a second polymer segment comprising a polyol structure.

3. The battery module of claim 2, wherein the first polymer segment comprises bonds of aromatic polyurethane or bonds of aromatic urea.

4. The battery module of claim 2, wherein the second polymer segment comprises at least one aliphatic polyol selected from the group consisting of polyethylene glycol, polytetramethylene ether glycol, polypropylene glycol, polycarbonate diol, polycaprolactone diol, and an ethylene-propylene glycol copolymer.

5. The battery module of claim 1, wherein the conductive layer is formed of at least one selected from the group consisting of aluminium (Al), nickel (Ni), copper (Cu), silver (Ag), gold (Au), zinc (Zn), tin (Sn), and iron (Fe), or alloys thereof.

6. The battery module of claim 1, wherein the conductive layer is formed of at least one material selected from the group consisting of a carbon rod, spherical carbon, carbon nanotubes, and graphene.

7. The battery module of claim 1, wherein the heat conduction member has a thickness greater than a thickness of the sealing portion.

8. The battery module of claim 1, wherein the porous insulating layer is provided with a plurality of pores formed therein, or is provided with a through-hole penetrating through the porous insulating layer in a thickness direction.

9. The battery module of claim 1, wherein the heat conduction member has shrinkage of 90% or less in the thickness direction.

10. The battery module of claim 1, wherein the heat conduction member has a thickness of 100 μm to 500 μm.

11. The battery module of claim 1, further comprising:
a cooling device coupled to the second plate.

12. The battery module of claim 1, wherein the heat conduction member has an elongation rate of 10% or less in a thickness direction.

* * * * *